(12) United States Patent
Usui (10) Patent No.: US 11,312,062 B2
(45) Date of Patent: Apr. 26, 2022

(54) HIGH-PRESSURE TANK MANUFACTURING METHOD

(71) Applicant: TOYOTA JIDOSHA KABUSHIKI KAISHA, Toyota (JP)

(72) Inventor: Takashi Usui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/728,189

(22) Filed: Dec. 27, 2019

(65) Prior Publication Data
US 2020/0230865 A1    Jul. 23, 2020

(30) Foreign Application Priority Data

Jan. 21, 2019  (JP) .............................. JP2019-007557

(51) Int. Cl.
*B29C 53/60* (2006.01)
*B29C 70/30* (2006.01)

(52) U.S. Cl.
CPC ............ *B29C 53/602* (2013.01); *B29C 70/30* (2013.01); *F17C 2201/0109* (2013.01); *F17C 2203/0621* (2013.01); *F17C 2203/0646* (2013.01); *F17C 2203/0668* (2013.01); *F17C 2209/2154* (2013.01)

(58) Field of Classification Search
CPC ...... F17C 2203/0646; F17C 2203/0621; F17C 2201/0109; F17C 2203/0668; F17C 2209/2154; B29K 2995/0005; B29C 53/602; B29C 2035/0811; B29C 70/885; B29C 53/845; B29C 53/582; B29C 53/005; B29C 70/882; B29L 2031/7156
See application file for complete search history.

(56) References Cited

U.S. PATENT DOCUMENTS

2014/0308433 A1   10/2014  Ouellette

FOREIGN PATENT DOCUMENTS

| JP | 2012066498 A | 4/2012 |
|---|---|---|
| JP | 2012148544 A | 8/2012 |
| JP | 2013-163305 A | 8/2013 |
| JP | 2014-527483 A | 10/2014 |
| JP | 2018012235 A | 1/2018 |

OTHER PUBLICATIONS

Machine translation of JP 01-105099 (A); Publication date: Apr. 21, 1989; Inventor: Yamamoto Shiro.*

* cited by examiner

*Primary Examiner* — Vishal I Patel
(74) *Attorney, Agent, or Firm* — Dickinson Wright, PLLC (57) ABSTRACT

There is provided a high-pressure tank manufacturing method that ensures a shorten heating period compared with a conventional one and eliminates a need for taking out a material for heating after heating. A high-pressure tank manufacturing method includes: disposing a conductive heating material on an outer periphery of a resin liner; winding a conductive fiber with which thermosetting resin is impregnated around the outer periphery of the resin liner on which the heating material is disposed; and heating the heating material and the fiber on the outer periphery of the resin liner by induction heating to harden the thermosetting resin.

4 Claims, 5 Drawing Sheets

HIGH-PRESSURE TANK MANUFACTURING METHOD

CROSS REFERENCE TO RELATED APPLICATIONS

The present application claims priority from Japanese patent application JP 2019-007557 filed on Jan. 21, 2019, the entire content of which is hereby incorporated by reference into this application.

BACKGROUND

Technical Field

The present disclosure relates to a high-pressure tank manufacturing method.

Background Art

There has been conventionally known a disclosure regarding an induction heating method and its device that perform high-frequency induction heating on a heated object with induction heating coils and a high-pressure gas tank manufacturing method (see JP 2013-163305 A). An object of the conventional disclosure is to provide a new induction heating method that suppresses increase of fiber volume content percentage (increased Vf) of a fiber-reinforced resin layer formed by winding a fiber impregnated with thermosetting resin (see the paragraph 0006 to the paragraph 0008 in the literature). JP 2013-163305 A discloses the following induction heating method as means to achieve this object.

The conventional induction heating method described in JP 2013-163305 A performs the high-frequency induction heating on the heated object having the fiber-reinforced resin layer formed by winding the conductive fiber impregnated with the thermosetting resin on an outer periphery of a hollow container with the induction heating coils surrounding the heated object. This conventional induction heating method includes the following first step and second step performed after applying a high frequency current through the induction heating coil and inducing high-frequency induction heating (see claim 1 and the like in the literature).

The first step is a step of advancing heat by the high-frequency induction heating on a first fiber-reinforced resin layer occupying an outer superficial layer side of the fiber-reinforced resin layer prior to a second fiber-reinforced resin layer occupying a side of the hollow container with respect to the first fiber-reinforced resin layer. The second step is a step of causing heat on the second fiber-reinforced resin layer by high-frequency induction heating after the thermosetting resin contained in the first fiber-reinforced resin layer starts hardening.

With the conventional induction heating method, even when the thermosetting resin contained in the second fiber-reinforced resin layer receives the heat and results in deterioration of viscosity, the thermosetting resin in the second fiber-reinforced resin layer is obstructed by the first fiber-reinforced resin layer, which has already started hardening, and therefore the thermosetting resin is less likely to ooze out from the second fiber-reinforced resin layer. Consequently, by suppressing the oozing of the resin when the fiber-reinforced resin layer receives the high-frequency induction heating and increases its temperature, the fiber-reinforced resin layer can be suppressed to have the increased Vf (see the paragraph 0011 and the like in the literature).

Additionally, there has been conventionally known a method for manufacturing a composite article using a filament material and a liner (see claim 1 and the like in JP 2014-527483 T). The conventional method includes: a. a phase that prepares a material in a heat conductive relationship with an inner surface of the liner; b. a phase that provides an unhardened filament material to an outer surface of the liner, and c. a phase that heats a part of the material in the heat conductive relationship with the inner surface of the liner to harden the composite article through the heating of a part of the material.

SUMMARY

With the conventional induction heating method described in JP 2013-163305 A, after the thermosetting resin contained in the first fiber-reinforced resin layer, which occupies the outer superficial layer side of the fiber-reinforced resin layer, starts hardening, the heating is caused in the second fiber-reinforced resin layer, which occupies the side of the hollow container with respect to the first fiber-reinforced resin layer. Accordingly, although the excellent effect, ensuring suppressing the increase of Vf of the fiber-reinforced resin layer, is exhibited, a problem remains in shorting of a hardening time of the entire thermosetting resin.

The method for manufacturing the composite article described in JP 2014-527483 T prepares the material in the heat conductive relationship with the inner surface of the liner as in a. described above, and heats a part of the material to heat the unhardened filament material on the outer surface of the liner as in c. described above. Accordingly, the conventional method for manufacturing the composite article needs to take out the material in the heat conductive relationship with the inner surface of the liner after the phase c. of hardening the composite article, causing problems of complicated manufacturing process and requiring time.

The present disclosure provides a high-pressure tank manufacturing method that ensures the improved productivity compared with the conventional one.

One aspect of the present disclosure is a high-pressure tank manufacturing method including: disposing a conductive heating material on an outer periphery of a resin liner; winding a conductive fiber with which thermosetting resin is impregnated around the outer periphery of the resin liner on which the heating material is disposed; and heating the heating material and the fiber on the outer periphery of the resin liner by induction heating to harden the thermosetting resin.

According to the one aspect of the present disclosure, in the fiber wound around the outer periphery of the resin liner in the winding, a fiber constituting a deep layer portion near an outer surface of the resin liner is less likely to be heated in the heating compared with the fiber constituting a superficial layer portion separated from the outer surface of the resin liner. However, according to the one aspect of the present disclosure, the conductive heating material, which is disposed on the outer periphery of the resin liner in the disposing, is heated by induction heating in the heating.

Accordingly, in the fiber wound around the outer periphery of the resin liner in the winding, the thermosetting resin impregnated in the fiber constituting the deep layer portion near the outer surface of the resin liner is heated by induction heating with both of the heating material and the fiber in the heating. Therefore, in the heating, the thermosetting resin impregnated in the fiber constituting the deep layer portion near the outer surface of the resin liner and the thermosetting resin impregnated in the fiber constituting the superficial layer portion separated from the outer surface of the resin liner can be uniformly heated efficiently compared with the conventional one.

Additionally, the heating material is disposed on the outer periphery of the resin liner in the disposing, eliminating the need for taking out the heating material from an inside of the resin liner after terminating the heating. Accordingly, with the one aspect of the present disclosure, hardening time of the entire thermosetting resin on the outer periphery of the resin liner in the heating can be shortened compared with the conventional one, and the manufacturing steps of the high-pressure tank are simplified, and the manufacturing period can be shortened compared with the conventional one, thus ensuring the improved productivity of the high-pressure tank.

The present disclosure ensures providing the high-pressure tank manufacturing method that ensures the improved productivity compared with the conventional one.

DETAILED DESCRIPTION

The following describes embodiments of a high-pressure tank manufacturing method according to the present disclosure with reference to the drawings.

Figure 1:
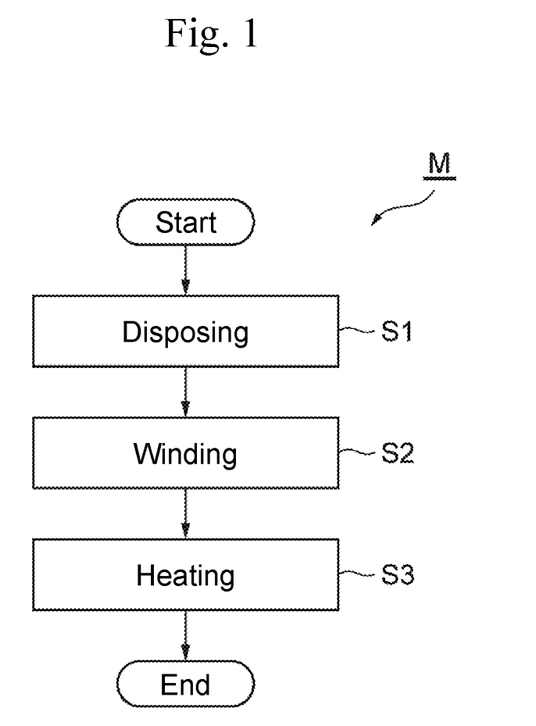
FIG. 1 is a flowchart illustrating each step of a high-pressure tank manufacturing method according to one embodiment of the present disclosure.
Figure 2:
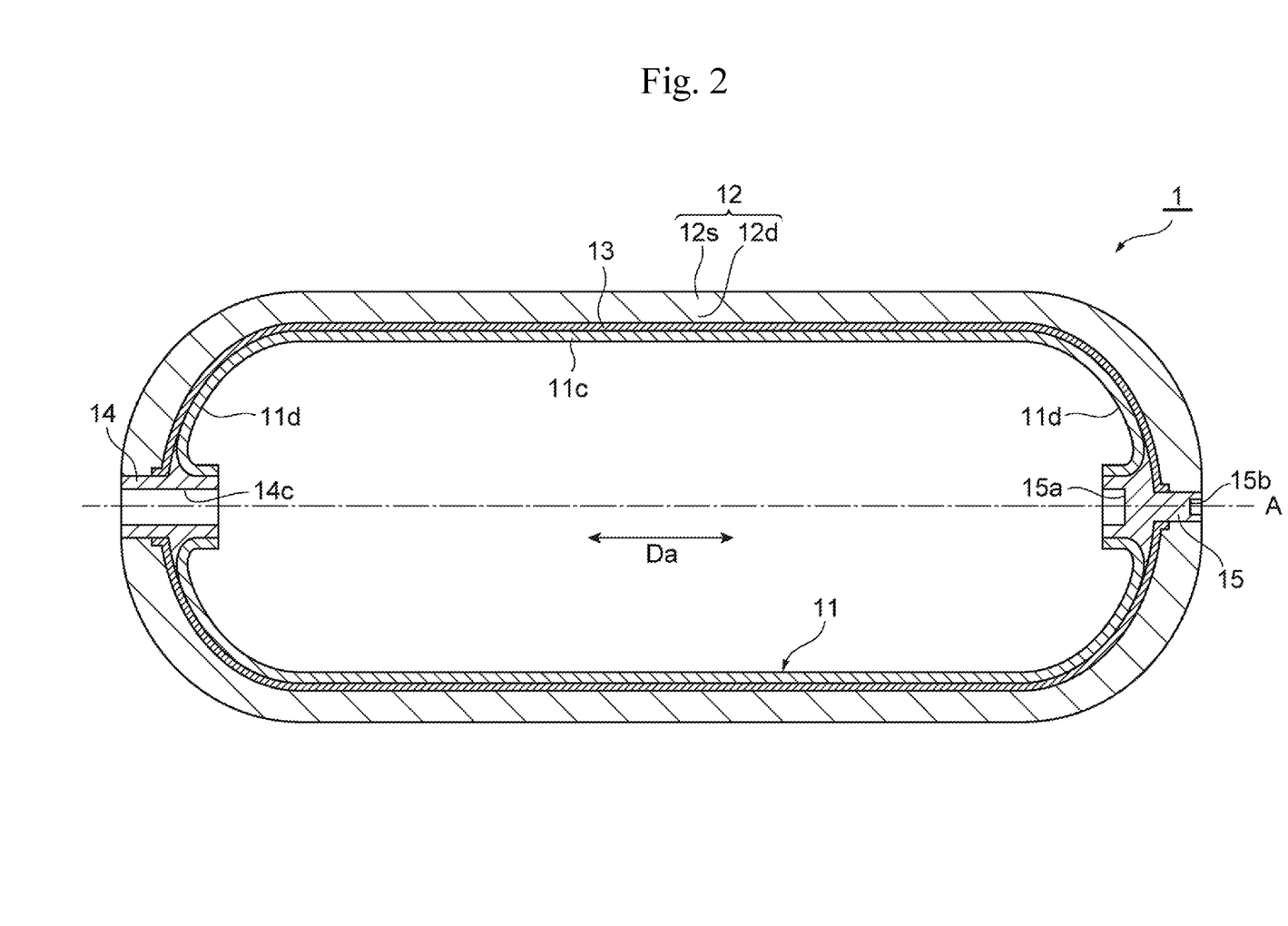
FIG. 2 is a schematic cross-sectional view illustrating an example of a configuration of a high-pressure tank.

FIG. 1 is a flowchart illustrating each step of a high-pressure tank manufacturing method M according to one embodiment of the present disclosure. FIG. 2 is a schematic cross-sectional view illustrating an example of a configuration of a high-pressure tank 1 produced by the high-pressure tank manufacturing method M illustrated in FIG. 1.

The high-pressure tank manufacturing method M according to this embodiment is a manufacturing method for a high-pressure gas tank that stores a high-pressure gas, for example, around 35 [MPa] or 70 [MPa]. Specifically, the high-pressure tank 1 is, for example, a container that stores a high-pressure hydrogen gas as described above. More specifically, the high-pressure tank 1 is, for example, a high-pressure tank for vehicle mounted to a fuel cell vehicle to supply a fuel cell stack, which constitutes an electric generating unit of the fuel cell vehicle, with a hydrogen gas. The high-pressure tank 1 includes, for example, a resin liner 11, a fiber-reinforced resin layer 12, and a heated layer 13. In the example illustrated in FIG. 2, the high-pressure tank 1 further includes bases 14 and 15.

The resin liner 11 is a hollow container made of a resin having a gas harder property. As the resin constituting the resin liner 11, for example, polyamide synthetic resin, such as nylon, and ethylene vinyl alcohol copolymer (EVOH) are usable. The resin liner 11 includes, for example, a cylinder portion 11c and a pair of dome portions 11d on both sides in the axial direction Da of the cylinder portion 11c. The cylinder portion 11c is, for example, a cylindrical part around a center axis A extending in the longitudinal direction of the resin liner 11. The dome portions 11d are dome-shaped parts disposed on both ends in the axial direction Da of the cylinder portion 11c.

The fiber-reinforced resin layer 12 is mainly constituted of a hardened thermosetting resin and a conductive fiber. The fiber-reinforced resin layer 12 includes, for example, a deep layer portion 12d near an outer surface of the resin liner 11 and a superficial layer portion 12s separated from the outer surface of the resin liner 11. The superficial layer portion 12s is, for example, a part including the outer surface of the fiber-reinforced resin layer 12 and having a thickness around a half of a thickness of the fiber-reinforced resin layer 12. The deep layer portion 12d is, for example, a part including an inner surface of the fiber-reinforced resin layer 12 opposed to the outer surface of the resin liner 11 or the outer surface of the heated layer 13 and having a thickness around a half of the thickness of the fiber-reinforced resin layer 12.

As the thermosetting resin constituting the fiber-reinforced resin layer 12, for example, epoxy resin is usable. As the conductive fiber, for example, carbon fiber is usable. Although the details will be described later, the conductive fiber constituting the fiber-reinforced resin layer 12 is wound around an outer periphery of the resin liner 11 with which unhardened thermosetting resin is impregnated. The thermosetting resin constituting the fiber-reinforced resin layer 12 is disposed on the outer periphery of the resin liner 11 in the unhardened state impregnated in the fiber constituting the fiber-reinforced resin layer 12 and is heated to harden on the outer periphery of the resin liner 11.

The heated layer 13 is a layer of a heating material 13m (see FIG. 3) disposed on the outer periphery of the resin liner 11. As the heating material 13m, a material having a conductive property that can be heated through induction heating is usable. Additionally, from the aspect of promoting the heating by induction heating, an electrical resistivity of the heating material 13m is lower than an electrical resistivity of the conductive fiber constituting the fiber-reinforced resin layer 12 in some embodiments. As a specific example of the heating material 13m, a strip-shaped metal foil 13f can be exemplified. As long as metal has a conductive property and heated by induction heating, the material of the metal foil 13f is not specifically limited. However, from aspects such as workability and industrial applicability, the metal foil 13f is an aluminum foil in some embodiments.

For example, the bases 14 and 15 are disposed on both end portions of the high-pressure tank 1 in a direction parallel to the center axis A of the cylinder portion 11c of the resin liner 11, which is the center axis of the high-pressure tank 1 as well. More specifically, the bases 14 and 15 are disposed at the center portions including apexes of the dome portions 11d of the resin liner 11. Among the pair of bases 14 and 15 on both end portions of the high-pressure tank 1, the one base 14 includes a flow passage 14c having openings inside and outside the high-pressure tank 1, and the other base 15 has recessed portions 15a and 15b inside and outside the high-pressure tank 1.

The flow passage 14c of the base 14 serves as an output/inlet of fluid stored in the high-pressure tank 1. Although details will be described later, the pair of bases 14 and 15 also function as supporting portions to support the resin liner 11 during production of the high-pressure tank 1. As materials of the bases 14 and 15, for example, a conductive metallic material, such as aluminum, stainless steel, and titanium alloy, is usable. The material of the bases 14 and 15 may be, for example, an insulating material having an electrical insulating property, such as ceramics and resin.

As illustrated in FIG. 1, the high-pressure tank manufacturing method M according to this embodiment includes a disposing step S1, a winding step S2, and a heating step S3. The following describes each step of the high-pressure tank manufacturing method M according to this embodiment in detail.

Figure 3:
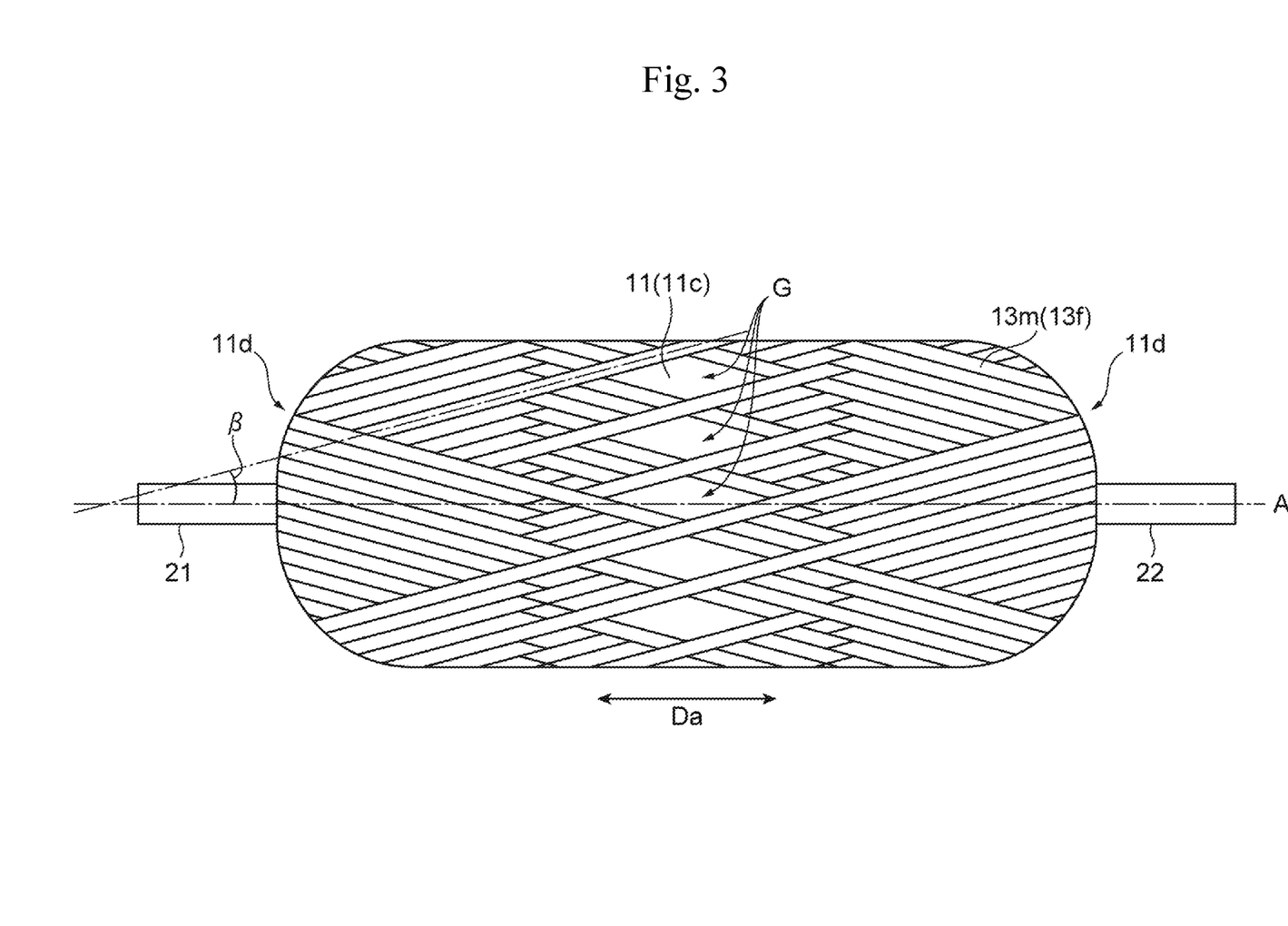
FIG. 3 is a schematic diagram of a resin liner having an outer periphery on which a heating material is disposed in a disposing step illustrated in FIG. 1.

FIG. 3 is a schematic diagram of the resin liner 11 in a state where the heating material 13m is disposed on the outer periphery in the disposing step S1. As described above, the resin liner 11 has a three-dimensional shape including the cylinder portion 11c and the dome portions 11d, which are disposed on both portions in the direction parallel to the center axis A of the cylinder portion 11c. Note that FIG. 3 illustrates the resin liner 11 in a plane by simplifying its shape.

The disposing step S1 is a step of disposing the conductive heating material 13m on the outer periphery of the resin liner 11. As illustrated in FIG. 2, the disposing step S1 ensures forming the heated layer 13 on the outer periphery of the resin liner 11. In some embodiments, from the aspect of facilitating the heating of the heating material 13m by induction heating in the heating step S3, the heating material 13m has the electrical resistivity lower than the electrical resistivity of the conductive fiber wound around the outer periphery of the resin liner 11 in the winding step S2. In this embodiment, the strip-shaped metal foil 13f is used as the heating material 13m, and the metal foil 13f is wound around the outer periphery of the resin liner 11 in the disposing step S1. Specifically, the metal foil 13f is, for example, an aluminum foil.

In the disposing step S1, for example, a shaft 21 (see FIG. 3) parallel to the axial direction Da of the resin liner 11 illustrated in FIG. 2 is inserted into the flow passage 14c of the one base 14 among the pair of bases 14 and 15 secured to the resin liner 11, and a distal end of the shaft 21 is engaged with the recessed portion 15a inside the resin liner 11 among the pair of recessed portions 15a and 15b of the other base 15. Furthermore, among the pair of recessed portions 15a and 15b of the base 15, a distal end of another shaft 22 (see FIG. 3) parallel to the axial direction Da of the resin liner 11 is engaged with the recessed portion 15b outside the resin liner 11. Thus, the pair of shafts 21 and 22 support the pair of bases 14 and 15 secured to the resin liner 11. The shafts 21 and 22 are, for example, disposed to be rotatable around the center axis A of the resin liner 11 with an appropriate rotation mechanism (not illustrated).

In the disposing step S1, for example, the pair of shafts 21 and 22, which support the pair of bases 14 and 15 secured to the resin liner 11, are rotated, and while the resin liner 11 is rotated around the center axis A, the long, strip-shaped metal foil 13f is wound around the outer periphery of the resin liner 11. In the disposing step S1, for example, as illustrated in FIG. 3, the metal foil 13f is gaplessly wound around the dome portions 11d and both end portions in the axial direction Da of the cylinder portion 11c of the resin liner 11, and the metal foil 13f is wound around while clearances G are provided in the center portion in the axial direction Da of the cylinder portion 11c.

For example, in the disposing step S1, assume that the strip-shaped metal foil 13f is wound around the outer periphery of the resin liner 11 by spiral winding. Here, the spiral winding is a way of winding where an angle β of the strip-shaped metal foil 13f to be wound relative to the center axis A of the resin liner 11 becomes more than 0 degrees and less than 45 degrees. In this case, for example, while the angle β of the strip-shaped metal foil 13f relative to the center axis A of the resin liner 11 is increased and decreased, the metal foil 13f is wound around the outer periphery of the resin liner 11. Thus, on both end portions in the axial direction Da of the resin liner 11, the strip-shaped metal foil 13f is gaplessly wound around the outer surface of the resin liner 11. In the center portion in the axial direction Da of the resin liner 11, the strip-shaped metal foil 13f is wound around with the clearances G in a circumferential direction of the outer surface of the resin liner 11, and a part of the outer surface of the resin liner 11 is exposed in the clearances G.

Although the illustration omitted, for example, in the disposing step S1, assume the case where the strip-shaped metal foil 13f is wound around the outer periphery of the resin liner 11 by cylindrical winding. Here, the cylindrical winding is a way of winding where the angle β of the strip-shaped metal foil 13f to be wound relative to the axial direction Da of the resin liner 11 becomes 45 degrees or more and less than 90 degrees. In this case as well, for example, while the angle β of the strip-shaped metal foil 13f relative to the center axis A of the resin liner 11 is increased and decreased, the metal foil 13f is wound around the outer periphery of the resin liner 11. Thus, on both end portions in the axial direction Da of the resin liner 11, the strip-shaped metal foil 13f is gaplessly wound around the outer surface of the resin liner 11. In the center portion in the axial direction Da of the resin liner 11, the strip-shaped metal foil 13f is wound around with the clearances in the axial direction Da of the outer surface of the resin liner 11, and a part of the outer surface of the resin liner 11 is exposed in the clearances.

For example, in the disposing step S1, the strip-shaped metal foil 13f may be wound around the outer periphery of the resin liner 11 in combination with the spiral winding and the cylindrical winding appropriately. In this case as well, for example, while the angle β of the strip-shaped metal foil 13f relative to the center axis A of the resin liner 11 is increased and decreased, the metal foil 13f is wound around the outer periphery of the resin liner 11. Thus, the metal foil 13f can be gaplessly wound around the dome portions 11d and both end portions in the axial direction Da of the cylinder portion 11c of the resin liner 11, and the metal foil 13f can be wound around with the clearances G in the axial direction Da of the center portion of the cylinder portion 11c.

The method for disposing the heating material 13m on the outer periphery of the resin liner 11 in the disposing step S1 is not limited to the above-described methods. For example, in the disposing step S1, using a conductive fiber or a metal wire rod with which thermosetting resin is not impregnated as a heating material, the conductive fiber or the metal wire rod may be wound around the outer periphery of the resin liner 11 to dispose the heating material on the outer periphery of the resin liner 11. Additionally, in the disposing step S1, as the heating material, a conductive mesh or sheet may be used instead of the strip-shaped metal foil 13f. In the disposing step S1, a conductive heating material may be disposed on the outer periphery of the resin liner 11 by application or spraying. In both cases, the electrical resistivity of the heating material is lower than the electrical resistivity of the conductive fiber wound around the outer periphery of the resin liner 11 in the winding step S2 in some embodiments.

The winding step S2 is a step of winding the conductive fiber with which the thermosetting resin is impregnated around the outer periphery of the resin liner 11 where the heating material 13*m* illustrated in FIG. 3 is disposed. In the winding step S2, the conductive fiber impregnated with the thermosetting resin is repeatedly wound around the outer periphery of the resin liner 11 where the heating material 13*m* is disposed by, for example, the known filament winding method (FW method) described in JP 2013-163305 A. As the conductive fiber wound around the outer periphery of the resin liner 11 in the winding step S2 is, for example, carbon fiber is usable.

In the winding step S2, as the way of winding of the fiber around the outer periphery of the resin liner 11 where the heating material 13*m* is disposed, similarly to the way of winding of the metal foil 13*f* in the above-described disposing step S1, the heating material 13*m* can be wound while the resin liner 11 is rotated. Additionally, the way of winding the fiber in the winding step S2 as well, similarly to the way of winding of the metal foil 13*f* in the above-described disposing step S1, the spiral winding, the cylindrical winding, and the combination of these windings are appropriately usable.

Figure 4:
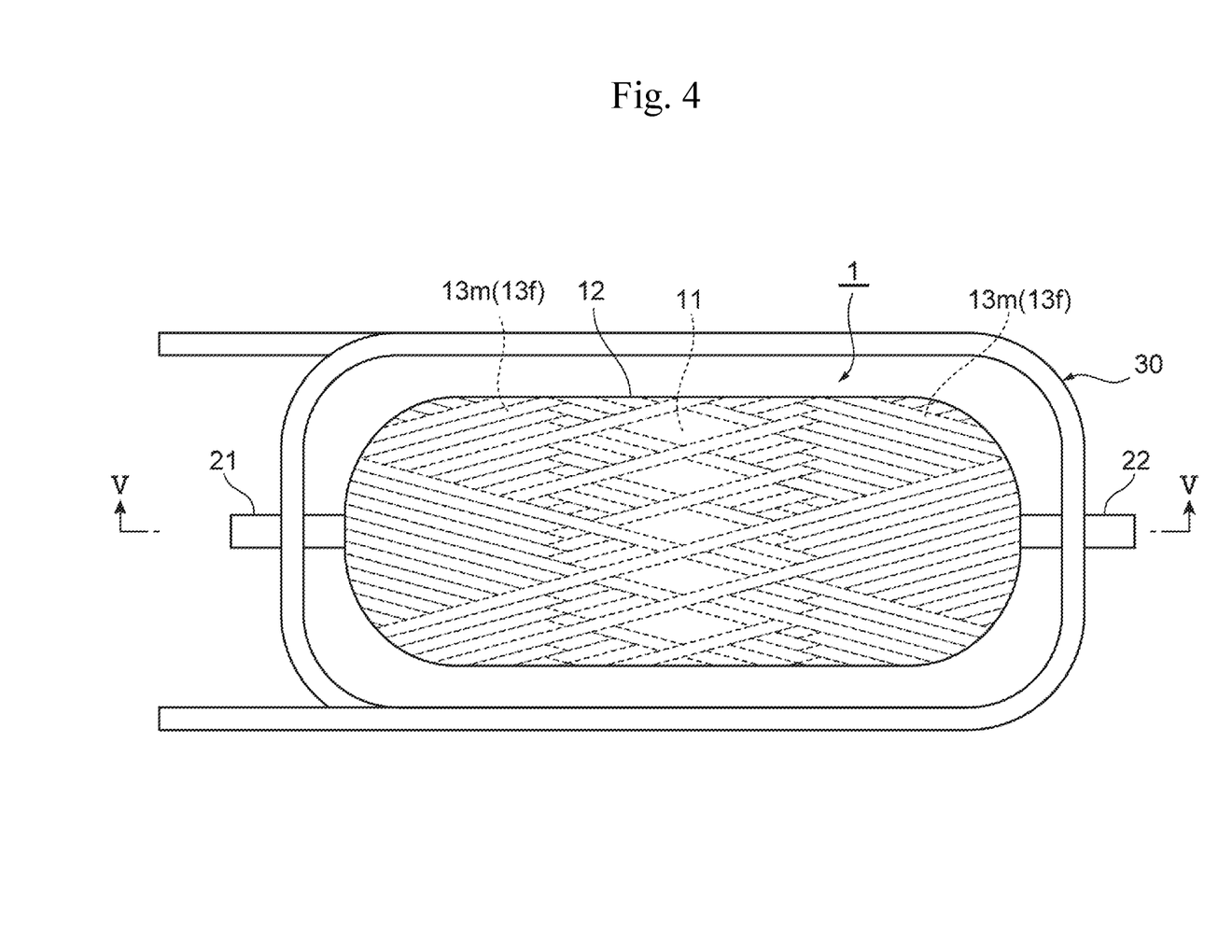
FIG. 4 is a schematic plan view of the high-pressure tank produced through a heating step illustrated in FIG. 1.
Figure 5:
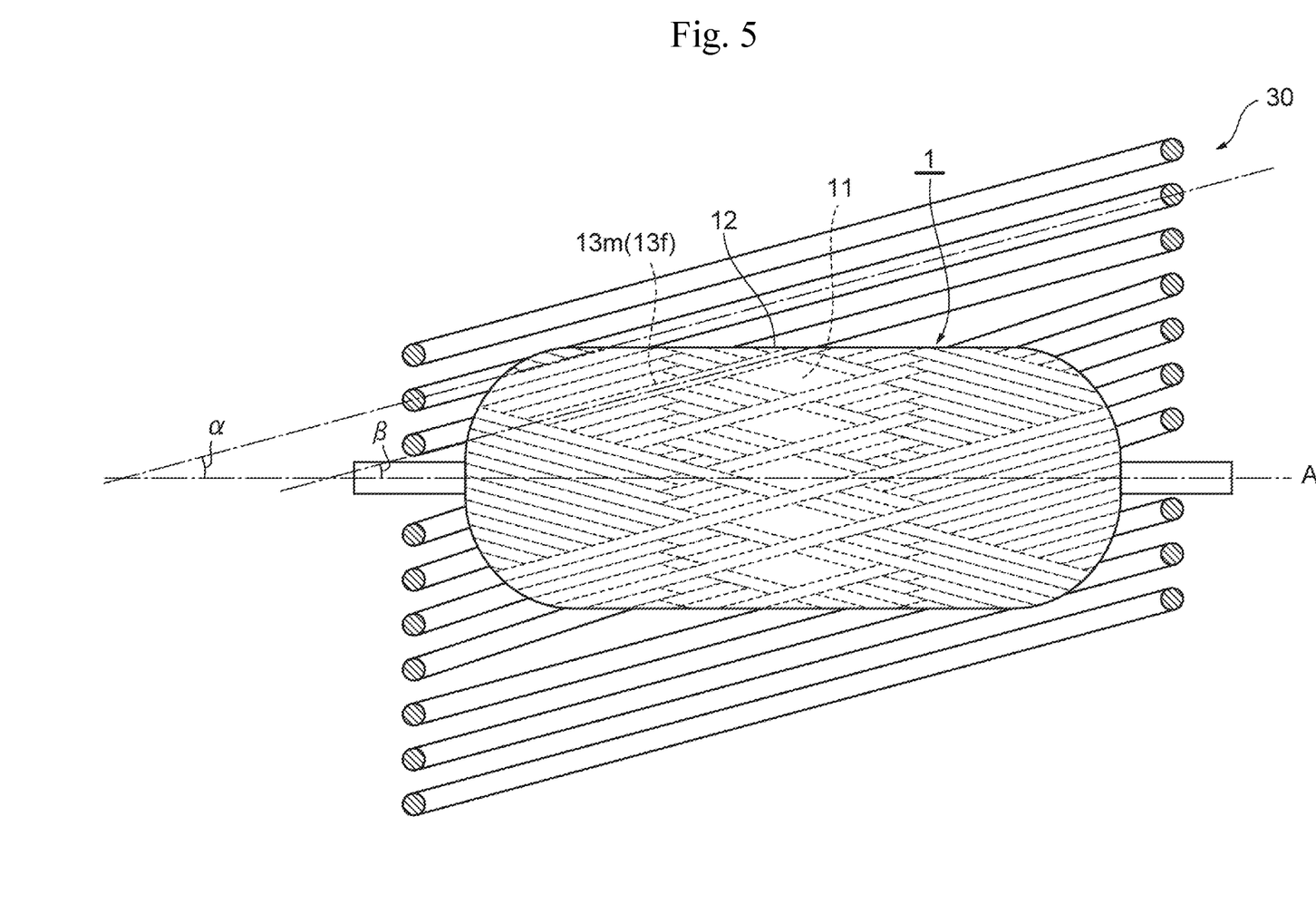
FIG. 5 is a cross-sectional view taken along a line V-V of an induction heating coil around the high-pressure tank illustrated in FIG. 4.

FIG. 4 is a schematic plan view of the high-pressure tank 1 produced through the heating step S3 illustrated in FIG. 1. FIG. 5 is a cross-sectional view taken along the line V-V of an induction heating coil 30 around the high-pressure tank 1 illustrated in FIG. 4. FIG. 5 illustrates a state of cutting off only the induction heating coil 30.

The heating step S3 is a step of heating the heating material 13*m* and the fiber on the outer periphery of the resin liner 11 by induction heating to harden the thermosetting resin. More specifically, the heating step S3 is a step of heating both of the conductive heating material 13*m* disposed on the outer periphery of the resin liner 11 in the disposing step S1 and the conductive fiber wound around the heating material 13*m* in the winding step S2 by induction heating using the induction heating coil 30 to harden the unhardened thermosetting resin on the outer periphery of the resin liner 11. In the heating step S3, the resin liner 11 that has undergone the winding step S2 is, for example, rotated around the center axis A by the rotation of the shafts 21 and 22.

In the example illustrated in FIG. 4 and FIG. 5, the resin liner 11, where the heating material 13*m* is disposed on the outer periphery through the winding step S2 and the conductive fiber impregnated with the unhardened thermosetting resin is further wound around the heating material 13*m*, is entirely disposed inside the induction heating coil 30. However, in the heating step S3, in the case where the resin liner 11 rotates around the center axis A, only a part in a radial direction of the resin liner 11 that has undergone the winding step S2 may be disposed inside the induction heating coil 30.

In the heating step S3, from the aspect of efficiently heating the strip-shaped metal foil 13*f* as the heating material 13*m* by induction heating, at least a part of the induction heating coil 30 disposed on the peripheral area of the resin liner 11 is wound along the metal foil 13*f* wound around the resin liner 11 in some embodiments. In the example illustrated in FIG. 5, at least a part of the strip-shaped metal foil 13*f* wound around the outer periphery of the resin liner 11 by spiral winding is wound around the resin liner 11 at the angle of, for example, more than 0 degrees and less than 45 degrees relative to the center axis A of the resin liner 11.

In this case, at least a part of the induction heating coil 30 wound in the spiral pattern is, for example, wound around at an angle $\alpha$ equal to the angle $\beta$ relative to the center axis A of the resin liner 11 in some embodiments. Further, a difference between the angle $\beta$ of the strip-shaped metal foil 13*f* relative to the center axis A of the resin liner 11 and the angle $\alpha$ of the induction heating coil 30 relative to the center axis A of the resin liner 11 is, for example, less than 30 degrees in some embodiments, less than 20 degrees in some embodiments, and less than 10 degrees in some embodiments.

Thus, it can be said that the induction heating coil 30 is wound along the metal foil 13*f* with the difference between the angle $\alpha$ and the angle $\beta$ of, for example, 0 degrees or more and less than 30 degrees. Obviously, in the disposing step S1, the strip-shaped metal foil 13*f* may be wound around the resin liner 11 while the angle $\beta$ is adjusted such that the difference between the angle $\alpha$ of the induction heating coil 30 and the angle $\beta$ of the strip-shaped metal foil 13*f* becomes less than 30 degrees.

In the heating step S3, electric power supplied to the induction heating coil 30 and a frequency of a power supply are not specifically limited. The electric power supplied to the induction heating coil 30 and the frequency of the power supply can be set based on, for example, the thickness of the fiber-reinforced resin layer 12, a distance between the fiber constituting the fiber-reinforced resin layer 12 and the induction heating coil 30, a temperature rising rate of the thermosetting resin constituting the fiber-reinforced resin layer 12, and the like.

The following describes actions of the high-pressure tank manufacturing method M according to this embodiment.

The high-pressure tank manufacturing method M according to this embodiment has the following respective steps as described above. The first is the disposing step S1 that disposes the conductive heating material 13*m* on the outer periphery of the resin liner 11. The next is the winding step S2 that winds the conductive fiber with which the thermosetting resin is impregnated on the outer periphery of the resin liner 11 where the heating material 13*m* is disposed. The next is the heating step S3 that heats the heating material 13*m* and the fiber on the outer periphery of the resin liner 11 by induction heating to harden the thermosetting resin.

In the high-pressure tank manufacturing method M, in the fiber wound around the outer periphery of the resin liner 11 in the winding step S2, the fiber constituting the deep layer portion 12*d* near the outer surface of the resin liner 11 in the fiber-reinforced resin layer 12 is less likely to be heated in the heating step S3 compared with the fiber constituting the superficial layer portion 12*s* separated from the outer surface of the resin liner 11. However, the high-pressure tank manufacturing method M according to this embodiment heats the conductive heating material 13*m*, which is disposed on the outer periphery of the resin liner 11 to form the heated layer 13 in the disposing step S1, by induction heating in the heating step S3.

Accordingly, in the fiber wound around the outer periphery of the resin liner 11 in the winding step S2, the unhardened thermosetting resin impregnated in the fiber constituting the deep layer portion 12*d* near the outer surface of the resin liner 11 is heated by induction heating with both of the heating material 13*m* and the fiber in the heating step S3. Therefore, in the heating step S3, the unhardened thermosetting resin impregnated in the fiber constituting the deep layer portion 12*d* near the outer surface of the resin liner 11 and the unhardened thermosetting resin impregnated in the fiber constituting the superficial layer portion 12*s* separated from the outer surface of the resin liner 11 can be uniformly heated efficiently compared with the conventional one.

Additionally, the heating material 13*m* is disposed on the outer periphery of the resin liner 11 in the disposing step S1, eliminating the need for taking out the heating material 13m from the inside of the resin liner 11 after terminating the heating step S3. Accordingly, with the high-pressure tank manufacturing method M according to this embodiment, hardening time of the entire thermosetting resin constituting the superficial layer portion 12s and the deep layer portion 12d on the outer periphery of the resin liner 11 in the heating step S3 can be shortened compared with the conventional one. With the high-pressure tank manufacturing method M according to this embodiment, the manufacturing steps of the high-pressure tank are simplified, and the manufacturing period can be shortened compared with the conventional one, thus ensuring the improved productivity of the high-pressure tank 1.

In the high-pressure tank manufacturing method M according to this embodiment, the electrical resistivity of the conductive heating material 13m disposed on the outer periphery of the resin liner 11 in the disposing step S1 is lower than the electrical resistivity of the conductive fiber wound around the outer periphery of the resin liner 11 where the heating material 13m is disposed in the winding step S2.

This ensures efficiently heating the heating material 13m by induction heating compared with the conductive fiber constituting the fiber-reinforced resin layer 12 in the heating step S3. Thus, the thermosetting resin constituting the deep layer portion 12d of the fiber-reinforced resin layer 12 can be efficiently heated with the heating material 13m, thereby ensuring shortening the hardening time of the thermosetting resin constituting the deep layer portion 12d.

Moreover, in the high-pressure tank manufacturing method M according to this embodiment, the heating material 13m is the strip-shaped metal foil 13f. In the high-pressure tank manufacturing method M according to this embodiment, the metal foil 13f is wound around the outer periphery of the resin liner 11 in the disposing step S1.

Accordingly, similarly to the fiber constituting the fiber-reinforced resin layer 12, for example, the heating material 13m can be wound around the outer periphery of the resin liner 11 to be disposed. By regulating the way of winding of the metal foil 13f to the resin liner 11, the thickness of the heated layer 13 can be adjusted and the way of disposing the metal foil 13f can be differentiated according to a position of the resin liner 11.

With the high-pressure tank manufacturing method M according to this embodiment, at least a part of the induction heating coil 30 disposed around the resin liner 11 is wound along the metal foil 13f wound around the resin liner 11 in the heating step S3.

This ensures efficiently heating the metal foil 13f wound around the resin liner 11 in the heating step S3. Therefore, the hardening time of the thermosetting resin constituting the deep layer portion 12d of the fiber-reinforced resin layer 12 can be shortened, thereby ensuring shortening the hardening time of the entire thermosetting resin constituting the fiber-reinforced resin layer 12.

Further, with the high-pressure tank manufacturing method M according to this embodiment, the resin liner 11 includes the cylinder portion 11c and the pair of dome portions 11d on both sides in the axial direction Da of the cylinder portion 11c. With the high-pressure tank manufacturing method M according to this embodiment, the metal foil 13f is gaplessly wound around the dome portions 11d and both end portions in the axial direction Da of the cylinder portion 11c, and the metal foil 13f is wound around while the clearances G are provided in the center portion in the axial direction Da of the cylinder portion 11c in the disposing step S1.

Accordingly, in the winding step S2, the unhardened thermosetting resin impregnated in the fiber constituting the fiber-reinforced resin layer 12 is in contact with the outer surface of the resin liner 11 via the clearances G in the center portion in the axial direction Da of the cylinder portion 11c of the resin liner 11. On the other hand, in both end portions in the axial direction Da of the cylinder portion 11c and the dome portions 11d of the resin liner 11, the unhardened thermosetting resin impregnated with the fiber constituting the fiber-reinforced resin layer 12 is not in contact with the outer surface of the resin liner 11.

In the state, in the heating step S3, the unhardened thermosetting resin impregnated in the fiber constituting the fiber-reinforced resin layer 12 is heated to harden. The thermosetting resin after the hardening constituting the fiber-reinforced resin layer 12 adheres to the outer surface of the resin liner 11 via the clearances G in the center portion in the axial direction Da of the cylinder portion 11c of the resin liner 11. On the other hand, in both end portions in the axial direction Da of the cylinder portion 11c and the dome portions 11d of the resin liner 11, the heated layer 13 formed with the heating material 13m is interposed between the thermosetting resin after hardening constituting the fiber-reinforced resin layer 12 and the outer surface of the resin liner 11.

This ensures partially suppressing the adhesion between the thermosetting resin after hardening constituting the fiber-reinforced resin layer 12 and the outer surface of the resin liner 11 using the heating material 13m. This eliminates the need for an anti-adhesive agent conventionally used to suppress the adhesion between the hardened thermosetting resin constituting the fiber-reinforced resin layer 12 and the outer surface of the resin liner 11. Thus, in addition to ensuring saving the cost of the anti-adhesive agent, an application step of the anti-adhesive agent over the resin liner 11 can be omitted, thus allowing improving the productivity of the high-pressure tank 1.

With the high-pressure tank manufacturing method M according to this embodiment, the metal foil 13f is, for example, an aluminum foil.

This ensures the improved workability of the metal foil 13f, facilitating the winding of the heating material 13m to the resin liner 11, and improving the productivity of the disposing step S1. Furthermore, industrial applicability and availability of the metal foil 13f can be improved, and the manufacturing cost of the high-pressure tank 1 can be reduced.

In the high-pressure tank manufacturing method M according to this embodiment, the fiber constituting the fiber-reinforced resin layer 12 is carbon fiber.

Accordingly, the conductive property of the fiber constituting the fiber-reinforced resin layer 12 is ensured, and the fiber is heated by induction heating to ensure hardening the unhardened thermosetting resin impregnated in the fiber in the heating step S3. Additionally, strength of the fiber-reinforced resin layer 12 can be improved, and a pressure resistance, durability, and mechanical strength of the high-pressure tank 1 can be improved.

As described above, with the embodiments, the high-pressure tank manufacturing method M that ensures the improved productivity compared with the conventional one can be provided.

While the embodiments of the high-pressure tank manufacturing method according to the present disclosure have been described in detail with reference to the drawings, the specific configuration is not limited thereto. Design changes and the like within a scope not departing from the gist of the present disclosure are included in the present disclosure.

DESCRIPTION OF SYMBOLS

1 High pressure tank
11 Resin liner
11c Cylinder portion
11d Dome portion
13f Metal foil
13m Heating material
30 Induction heating coil
Da Axial direction
G Clearance
M high-pressure tank manufacturing method
S1 Disposing step
S2 Winding step
S3 Heating step

What is claimed is:

1. A high-pressure tank manufacturing method comprising:
    disposing a conductive heating material on an outer periphery of a resin liner;
    winding a conductive fiber with which thermosetting resin is impregnated around the outer periphery of the resin liner on which the heating material is disposed; and
    heating the heating material and the fiber on the outer periphery of the resin liner by induction heating to harden the thermosetting resin;
    wherein the heating material has an electrical resistivity lower than an electrical resistivity of the fiber;
    wherein the heating material is a strip-shaped metal foil, and
    wherein the disposing winds the metal foil around the outer periphery of the resin liner;
    wherein the resin liner includes a cylinder portion and a pair of dome portions on both sides in an axial direction of the cylinder portion, and
    wherein in the disposing, the metal foil is gaplessly wound around the dome portions and both end portions in the axial direction of the cylinder portion, and the metal foil is wound around with a clearance in a center portion in the axial direction of the cylinder portion.

2. The high-pressure tank manufacturing method according to claim 1,
    wherein in the heating, at least a part of an induction heating coil disposed around the resin liner is wound along the metal foil wound around the resin liner.

3. The high-pressure tank manufacturing method according to claim 1, wherein the metal foil is an aluminum foil.

4. The high-pressure tank manufacturing method according to claim 1,
    wherein the fiber is carbon fiber.

* * * * *